Aug. 27, 1957     T. C. GILLES     2,804,313
SAFETY HARNESS FOR USE IN VEHICLES
Filed Feb. 6, 1956
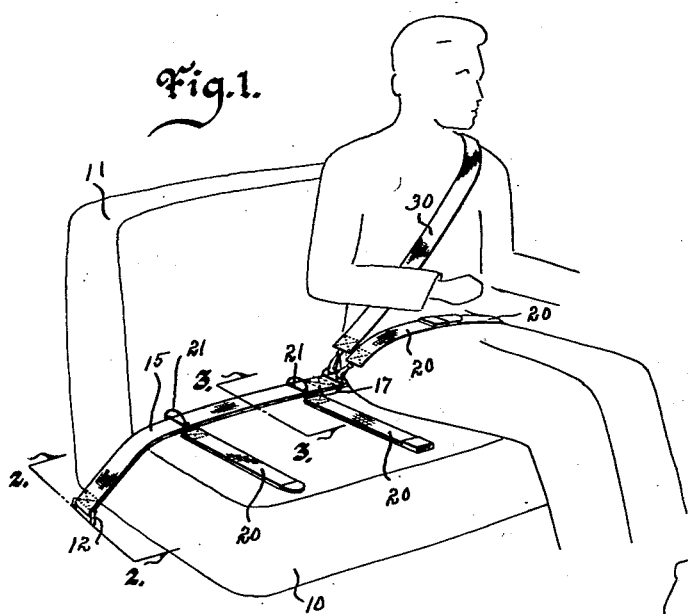
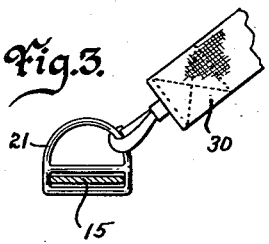
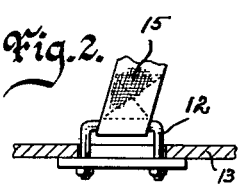
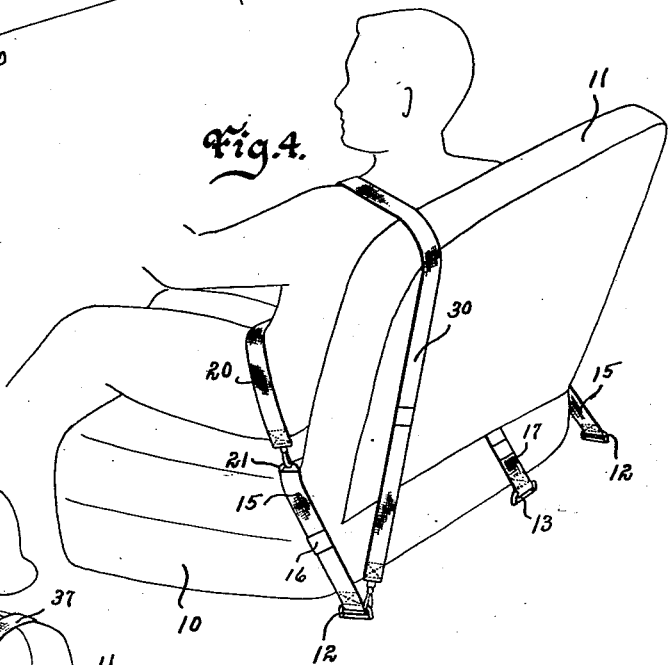
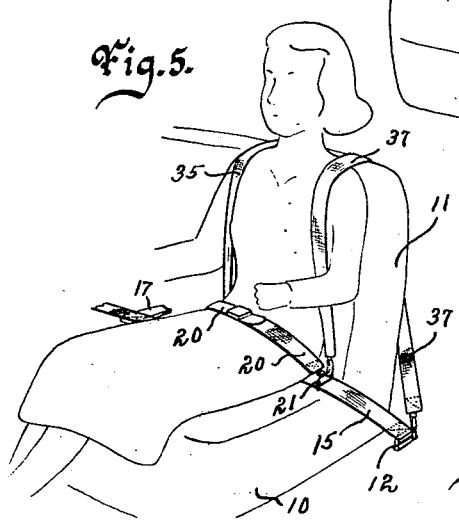
Inventor
Theodore C. Gilles
by M. Talbert Dick
Attorney

United States Patent Office 2,804,313
Patented Aug. 27, 1957

2,804,313

SAFETY HARNESS FOR USE IN VEHICLES

Theodore C. Gilles, Ottumwa, Iowa

Application February 6, 1956, Serial No. 563,663

7 Claims. (Cl. 280—150)

This invention relates to safety belts or harnesses and more particularly to ones used in automotive vehicles such as automobiles, trucks, airplanes and like, for saving the occupants from death or injury.

The idea of safety belts is old. Usually they consist of two belt straps detachably adjustably secured together at their free ends by a buckle. The rear end passes downwardly and rearwardly to be secured to anchoring means usually passing through the vehicle body floor. Sometimes the anchoring means is secured to the vehicle chassis frame. Mostly one belt means is used for each seat, although automobile and truck seats accommodate three or four persons. The chief objection to this method is that in case of accident the passengers are forced together or bunched thereby injuring each other. Often their heads crash together causing skull concussions. Furthermore, the belt due to its great length running transversely of the longitudinal length of the vehicle, must rather loosely pass in front of the occupants, and an objectionable forward give to the belt results.

While individual belts are much more desirable, their multiple arrangement across a wide seat has herebefore been impossible. Usually a compromise is made by using only two belts per seat for only two people. Even then the problem of small versus large individuals is always present. However, in both multiple belt and single belt installations, the seat often breaks loose in an accident and all of its force is at the rear of the occupant thereby wedging him between the seat and the retaining belt.

Therefore, one of the principal objects of my invention is to provide a safety belt harness that provides any required number of individual belts across a vehicle seat.

A further object of this invention is to provide a plurality of individual safety belts that automatically adjust to accommodate individuals of varying widths.

A still further object of my invention is to provide a safety harness belt that first separately holds the seat and secondly separately retains the occupant.

Still further objects of this invention are to provide a safety belt means that is economical in manufacture, durable in use, and refined in appearance.

These and other objects will be apparent to those skilled in the art.

My invention consists in the construction, arrangements, and combination of the various parts of the device, whereby the objects contemplated are attained as hereinafter more fully set forth, pointed out in my claims, and illustrated in the accompanying drawings, in which:

Fig. 1 is a perspective view of my device in use,

Fig. 2 is an enlarged view of the anchoring means,

Fig. 3 is an enlarged plan view of one method of securing a shoulder strap to the static line, Fig. 4 is a perspective back view of my device in use and more fully illustrates its construction, and Fig. 5 is a front perspective view of the device in use and employing two shoulder straps.

In these drawings I have used the numeral 10 to designate the seat portion and the numeral 11 the back portion of an automotive vehicle. Any suitable standard anchoring means may be used. These anchors 12 extend downwardly through the vehicle floor body at each rear end of the seat 10 and are suitably fastened below the floor body. Usually a center anchor means 13 is located approximately midway between the two anchor means 12 as shown in the drawings. Such three anchors are standard equipment in safety belts and I apply my invention thereto and which I will now describe in detail.

The heart of my invention is a static line 15, which may be a cable, rope, belt or like. This static line lays longitudinally across the top of the seat 10 adjacent the back 11, as shown in Fig. 1. The two end portions of this static line are secured to the two anchor means 12, respectively, by any suitable means. These anchor means are shown as U-bolts extending through the flooring 13 of the seating compartment of the vehicle. To permit the adjustment of the vehicle seat at least one end of this static line 15 should be longitudinally adjustable by a buckle, catch, snap or like 16. The center of this static line is secured at its center to the anchor 13 by a strap or like 17. With this static line taut, the entire vehicle seat will be held back and down from breaking loose from the vehicle floor in case of accident. The numeral 20 designates a plurality of strap lengths each having its rear end slidably secured to the static line 15. This may be accomplished by a loop or ring 21 on the rear of each strap and slidably embracing the static line 15. These straps 20 are in pairs at least one having a fastening means, buckle or like 25 at its outer free end. By adjustably securing the free ends of any pair of straps together in front of a user, they become an individual safety belt. By each strap 20 being slidably adjustable on the static line, any pair will automatically adjust the distance between their rear fastened ends to accommodate users of various widths. Also any reasonable number of pairs of belt straps may be placed on the static line to individually accommodate a capacity number of occupants on a given vehicle seat. Also due to the sliding of the belt straps on the static line a user may purposely slide laterally for comfort without detaching his retaining belt.

Another advantage of my static line is that it permits the use of shoulder harness straps. A strap 30 may be detachably secured at one end to the static line, passed up and across the user, and thence over the back of the back 11, and then down to be secured to an anchor means 12. Some individuals may wish to use two similar shoulder straps 35 and 37 each having one end secured to the static line and the other to an anchoring means 12 or 13.

Some changes may be made in the construction and arrangement of my safety harness for use in vehicles without departing from the real spirit and purpose of my invention, and it is my intention to cover by my claims, any modified forms of structure or use of mechanical equivalents which may be reasonably included within their scope.

I claim:

1. In a safety harness for use in automotive vehicles, a static line member adapted to extend longitudinally across the rear top of a vehicle seat and to be operatively secured at each end to the vehicle in which the seat exists, a plurality of straps having their rear ends secured to said static line member, and a means for connecting the free end portions of each pair of said straps together to form a belt adapted to extend at each side respectively in front of the passenger to be held.

2. In a safety harness for use in automotive vehicles, a static line member adapted to extend longitudinally across the rear top of a vehicle seat and to be operatively secured at each end to the vehicle in which the seats exists, a plurality of straps having their rear ends slidably secured to said static line member, and a means for connecting the free end portions of each pair of said straps together to form a belt adapted to extend at each side respectively in front of the passenger to be held.

3. In combination, a vehicle body, a seat in said vehicle body, an anchor means secured to said vehicle body at one of the rear ends of said seat, a second anchor means secured to said vehicle body at the other rear end of said seat, a static line member extending over the rear end of said seat, a static line member extending over the rear top of said seat and having its two ends secured to said two anchor means respectively, a plurality of pairs of straps each secured at its rear end to said static line member, and a means for detachably securing the outer end portions of each of said straps together.

4. In combination, a vehicle body, a seat in said vehicle body, an anchor means secured to said vehicle body at one of the rear ends of said seat, a second anchor means secured to said vehicle body at the other rear end of said seat, a static line member extending over the rear top of said seat and having its two ends secured to said two anchor means respectively, a plurality of pairs of straps each slidably secured at its rear end to said static line member, and a means for detachably securing the outer end portions of each of said straps together.

5. In combination, a vehicle body, a seat in said vehicle body, an anchor means secured to said vehicle body at one of the rear ends of said seat, a second anchor means secured to said vehicle body at the other rear end of said seat, a static line member extending over the rear top of said seat and having its two ends secured to said two anchor means respectively, a third anchor means secured to said vehicle body, and positioned between said first and second anchor means, a member secured to said third anchor means and to the central area of said static line member, a plurality of pairs of straps each secured at its rear end to said static line member, and a means for detachably securing the outer end portions of each of said straps together.

6. In combination, a vehicle body, a seat in said vehicle body, an anchor means secured to said vehicle body at one of the rear ends of said seat, a second anchor means secured to said vehicle body at the other rear end of said seat, a static line member extending over the rear top of said seat and having its two ends secured to said two anchor means respectively, a plurality of pairs of straps each secured at its rear end to said static line member, a means for detachably adjustably securing the outer end portions of each of said straps together, and a shoulder strap having one end secured to said static line member and one of said anchor means.

7. In combination, a vehicle body, a seat in said vehicle body, an anchor means secured to said vehicle body at one of the rear ends of said seat, a second anchor means secured to said vehicle body at the other rear end of said seat, a static line member extending over the rear top of said seat and having its two ends secured to said two anchor means respectively, means for adjusting the longitudinal length of said static line member, a plurality of pairs of straps each secured at its rear end to said static line member, and a means for detachably securing the outer end portions of each of said straps together.

References Cited in the file of this patent
UNITED STATES PATENTS

| | | |
|---|---|---|
| 2,267,373 | Carlisle | Dec. 23, 1941 |
| 2,365,625 | Carlisle | Dec. 19, 1944 |
| 2,710,649 | Griswold | June 14, 1955 |